United States Patent
Haberman et al.

(10) Patent No.: US 12,532,898 B2
(45) Date of Patent: Jan. 27, 2026

(54) METHODS OF COATING FROZEN FOOD PRODUCTS IN A CANDY COATING

(71) Applicant: Beyond Better Foods, LLC, Doylestown, PA (US)

(72) Inventors: Jennifer Haberman, Upper Black Eddy, PA (US); Michael Shoretz, Upper Black Eddy, PA (US)

(73) Assignee: Beyond Better Foods, LLC, Doylestown, PA (US)

( * ) Notice: Subject to any disclaimer, the term of this patent is extended or adjusted under 35 U.S.C. 154(b) by 0 days.

(21) Appl. No.: 18/743,642

(22) Filed: Jun. 14, 2024

(65) Prior Publication Data

US 2025/0380717 A1  Dec. 18, 2025

(51) Int. Cl.
| | |
|---|---|
| A23G 9/42 | (2006.01) |
| A23G 9/24 | (2006.01) |
| A23G 9/32 | (2006.01) |
| A23G 9/48 | (2006.01) |

(52) U.S. Cl.
CPC ............ *A23G 9/42* (2013.01); *A23G 9/245* (2013.01); *A23G 9/322* (2013.01); *A23G 9/327* (2013.01); *A23G 9/48* (2013.01)

(58) Field of Classification Search
CPC .......... A23G 9/48; A23G 9/245; A23G 9/322; A23G 9/327; A23G 9/42
See application file for complete search history.

(56) References Cited

U.S. PATENT DOCUMENTS

| | | | |
|---|---|---|---|
| 2016/0309742 A1* | 10/2016 | Ma | A23G 9/48 |
| 2022/0095641 A1 | 3/2022 | Murray | |
| 2022/0095643 A1 | 3/2022 | Murray | |
| 2022/0386677 A1 | 12/2022 | Murray | |

FOREIGN PATENT DOCUMENTS

| | | | |
|---|---|---|---|
| JP | 2003289808 A | * | 10/2003 |
| JP | 7148749 B1 | * | 10/2022 |
| KR | 102199617 B1 | * | 1/2021 |
| SU | 380303 A | * | 7/1973 |

OTHER PUBLICATIONS

SU-380303-A (Clarivate machine translation) (Year: 1973).*
JP-2003289808-A (Clarivate machine translation) (Year: 2003).*
JP-7148749-B1 (Clarivate machine translation) (Year: 2022).*
KR102199617B1 (Clarivate machine translation) (Year: 2021).*
Steffen, A., Frozen Chocolate-Covered Raspberries (2021), downloaded on May 3, 2025 from https://andrealflavor.com/frozen-chocolate-covered-raspberries/ (Year: 2021).*
Higgins, Sour Patch Grapes—Healthy Candy Recipe Idea! downloaded on Oct. 3, 2025 from https://chocolatecoveredkatie.com/sour-patch-grapes/ (Year: 2023).*

* cited by examiner

*Primary Examiner* — Nikki H. Dees
*Assistant Examiner* — Andrew E Merriam
(74) *Attorney, Agent, or Firm* — J. Peter Paredes; Amin Wasserman Gurnani LLP

(57) ABSTRACT

Provided herein are methods and systems for coating frozen food products in a candy coating.

8 Claims, 1 Drawing Sheet

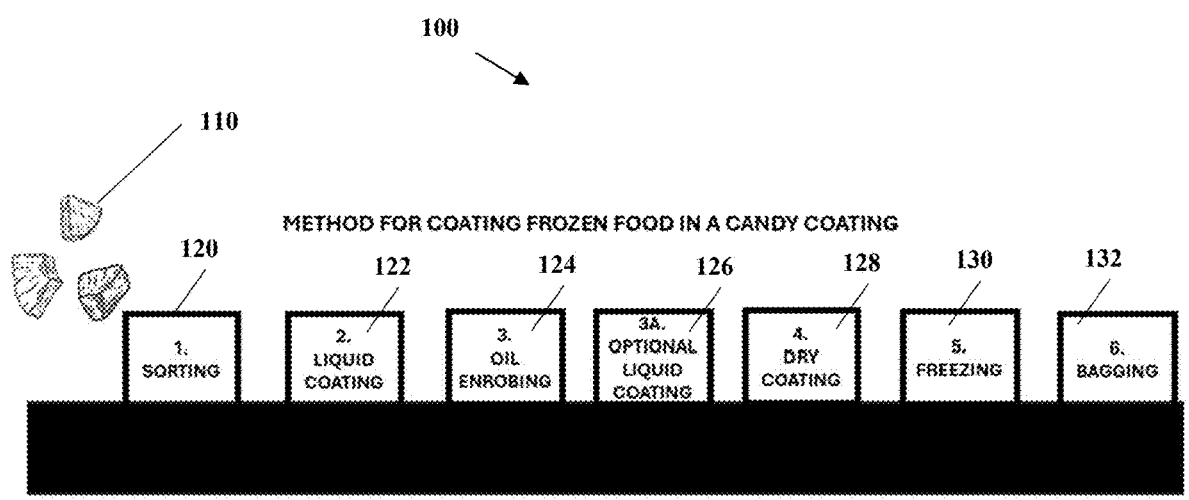

METHODS OF COATING FROZEN FOOD PRODUCTS IN A CANDY COATING

BACKGROUND

The invention generally relates to methods of processing candy coated frozen food products. More specifically, the present disclosure relates to covering frozen food products in a candy coating that includes sugar, acids, and flavorings.

One of the most significant challenges in coating frozen fruits with candy is the potential migration of moisture from the fruit to the candy coating. Fruits inherently contain high moisture content, and when coated directly with a sugar-based candy, there is a high risk that this moisture will migrate outwards, dissolving or weakening the candy shell. This not only compromises the integrity and crispness of the candy coating but also affects its longevity and aesthetic appeal.

The present invention solves these problems, as well as others.

SUMMARY OF THE INVENTION

Provided herein are methods and systems for coating frozen food products in a candy coating.

The methods and systems are set forth in part in the description which follows, and in part will be obvious from the description, or can be learned by practice of the methods and systems. The advantages of the methods and systems will be realized and attained by means of the elements and combinations particularly pointed out in the appended claims. It is to be understood that both the foregoing general description and the following detailed description are exemplary and explanatory only and are not restrictive of the methods and systems, as claimed.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

In the accompanying figures, like elements are identified by like reference numerals among the several preferred embodiments of the present invention.

FIG. 1 is a flow chart of method of coating a frozen food product, according to one embodiment.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes, or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g.," " or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, biochemical, and mechanical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DESCRIPTION OF EMBODIMENTS

Generally speaking, the method of coating a frozen food product comprises completely enrobing a frozen food product in a candy coating. More specifically, the method comprises completely enrobing a frozen food product in a thin layer of oil and then enrobing the thin layer of oil in a candy coating that may include various forms of sugar, acids, and colors or flavorings. The method comprises enveloping the frozen food product in at least a thin layer of candy coating and then rapidly chill and freeze the candy covered frozen food product in such a way that prevents the frozen product and its coating from becoming damaged in any way.

The method of coating frozen food with a candy coating, comprising applying an oil layer or coating prior to the candy-coating layer; wherein the oil layer provides a moisture barrier layer between the candy-coating layer and the frozen fruit, improves adhesion of the candy coating layer to the frozen food, and enhances flavor and texture of the candy coated frozen fruit product.

The oil coating layer acts as an effective moisture barrier between the fruit and candy coating, preventing moisture migrating from the fruit to the candy coating. Being hydrophobic, the oil repels water, thus preventing the moisture within the fruit from reaching the candy shell, ensuring the candy shell remains intact and dry, preserving both its texture and structural integrity.

In one embodiment, the oil coating enhances the adhesion between the frozen fruit and the candy shell. Oil provides a sticky, cohesive surface that helps the candy coating adhere better to the fruit. Without this oil layer, the candy coating might not stick uniformly to the frozen fruit, leading to uneven coating or parts of the fruit remaining exposed.

In one embodiment, the oil layer is a medium for flavor enhancement. Oils can be infused with flavors, spices, or essences that complement the fruit and the candy shell, adding depth and complexity to the overall flavor profile of the coated fruit. Additionally, the oil contributes to the textural experience by creating a smooth interface between the fruit and the candy, improving the mouthfeel and overall sensory attributes of the final product.

The oil coating provides a protective shield for the fruit during handling and processing. The oil layer reduces the risk of the fruit pieces sticking to each other or to machinery, facilitating easier handling and processing. This oil layer also helps in maintaining the structural integrity of the fruit during the coating process, ensuring that they do not get damaged or misshapen.

The method of applying an oil layer in the process of coating frozen fruits with candy coating addresses critical technical challenges, including, but not limited, moisture migration, adhesion, and flavor and texture enhancement, while also aiding in handling and processing. These benefits underscore the necessity of the oil layer, making it an indispensable part of achieving a high-quality coated fruit product.

In one embodiment, the frozen food product includes a frozen fruit. In some embodiments, the frozen fruit includes a piece of frozen pineapple, a grape, a piece of mango, a cherry, or any other suitable bite-size fruit or piece of fruit. The size of the frozen fruit may vary between about 1.0 inch×about 1.0 inch and about 2.0 inch×about 2.0 inch, alternatively between about 0.5 inch ×about 0.5 inch and about 3.0 inch×about 3.0 inch.

"Frozen Food" is any food product that has been frozen or kept at a temperature at or below 32° F./0° C. for a period of at least 5 minutes or more.

"Oil coating" is a coating of a cooking oil including avocado oil, coconut oil, olive oil, palm oil, soybean oil, canola oil (rapeseed oil), corn oil, peanut oil, and other vegetable oils.

"Thin layer" is a layer comprising a thickness between about 0.1 mm and about 1.0 mm, alternatively, between about 0.001 mm and about 0.1 mm.

"Completely enrobing" means covering the surface area or an outer layer of a frozen food product by at least 90%, alternatively covering at least 99% of the surface area or the outer layer of a frozen food product.

"Solidify" or "solidification" of oil means that the oil is in a solid state vs the liquid state.

In one embodiment, a candy coating comprises a mixture of sugar in various forms and flavors. In some embodiments, the sugar further contains acids in various forms such as citric or malic acid. In some embodiments, the candy coating comprises sugar substitutes such as allulose or erythritol. In some embodiments, candy coating includes a mixture of sugar and colors.

As shown in FIG. 1, the method of coating a frozen food product 100 comprises a frozen food product 110, such as a piece of frozen pineapple, which is received for processing, including whole pieces and partial pieces. Accordingly, in some embodiments, the method of coating a frozen food product 100 comprises a first step 120 in the process includes sorting the frozen food product. Sorting removes any pieces of the frozen food product that are too small (about 10 mm or less) to process and distributes the frozen food product along a conveyer belt creating space between the individual pieces. In some embodiments, the method of coating a frozen food product 100 comprises a second step 122 includes spraying the product with a liquid coating. In one embodiment, the liquid coating is fruit juice, such as lemon juice or lime juice. In some embodiments, the method of coating a frozen food product 100 comprises a third step 124 includes enrobing the frozen food product to completely coat it in a thin layer of oil coating, creating an enrobed frozen food product. In some embodiments, the oil coating is made from coconut oil or other types of oil such as avocado oil, sunflower oil, or a mixture of different types of oils. In some embodiments, the method of coating a frozen food product 100 comprises a fourth step 126 includes conveying the enrobed frozen food a long a belt and through a liquid coating, which may include sugars, flavors, or colors. In some embodiments, the method of coating a frozen food product 100 comprises a fifth step 128 conveying the enrobed frozen food along a belt and through a bath of powders, which may include sugars, flavors, or colors. In some embodiments, the method of coating a frozen food product 100 comprises a sixth step 130 freezing the enrobed frozen food. In some embodiments, the method of coating a frozen food product 100 comprises packaging 132 the frozen food in a refrigerated environment to prevent condensation from forming on the enrobed frozen food product.

Temperature

The temperature of the oil while being enrobing the frozen fruit is between about 20° C. and about 75° C., alternatively between about 30° C. and about 70° C., alternatively between about 40° C. and about 65° C., alternatively between about 45° C. and about 60° C., alternatively between about 50° C. and about 59° C., alternatively, between about 54° C. and about 59° C. The temperature of the oil ensures that the oil maintains a liquid consistency to coat the entirety of the frozen fruit product without transitioning to the solid state. The oil enrobing process may take place at ambient temperature before placing the enrobed frozen fruit and candy coating back to 0° C. to ensure frozen fruit maintains frozen consistency. The temperature of the oil will also depend on the hydrophobicity of the oil and the type of oil.

Hydrophobicity

The oil layer may include a varying degree of hydrophobicity, which will vary the transition state from the liquid to solid for enrobing the frozen fruit product. Hydrophobicity refers to the poor wettability of surfaces by water and is quantified using contact angle measurements. The difference in contact angle between oils varies due to the different fatty acid compositions. The contact angles of the droplets changed differently with decreased temperature. This was due to the difference in viscosity of each vegetable oil, which affected the surface tension. The contact angle can vary between 4 and 14 between temperatures of about 6° C. and about 26° C.

Contact Angle Measurement involves placing a droplet of water on the surface of the coconut oil and measuring the angle formed between the edge of the droplet and the surface. A higher contact angle indicates greater hydrophobicity.

Partition Coefficient involves measuring the distribution of a compound between two immiscible liquids, typically water and an organic solvent like coconut oil. The partition coefficient (log P) indicates how hydrophobic a substance is. A higher partition coefficient suggests higher hydrophobicity. The partition coefficient of the oil can vary between 0.14 and 0.94 log units in base 10.

Surface Tension can be measured using a tensiometer. Hydrophobic substances typically exhibit low surface tension when in contact with water. The surface tension measurement or surface tension of the oil is about 12.8 dynes $cm^{-1}$. Alternatively, the surface tension measurement or surface tension is between about 14.5 and about 22.9 dynes $cm^{-1}$ at 25°.

Oils

In one embodiment, the oil layer may comprise oils with both high and low percentages of saturated fats. Oils with a lower percentage of saturated fats, while effective in some contexts, do not maintain solidity at room temperature. This lack of solidity leads to issues with the consistency and integrity of the candy coating, particularly through various temperature states, adversely affecting the texture. In contrast, oils with a high percentage of saturated fat remained solid at room temperatures, crucially maintaining the structural integrity and tactile quality of the candy coating. This oil with high percentage of saturated fats is essential for ensuring that the coating does not melt or deform, thereby enhancing the consumer's eating experience. The use of high-saturated fat oils is optimal for achieving the desired outcomes in the final product, according to one embodiment.

In other embodiments, various oils may be used for the oil layer, including vegetable oils, and their suitability for the application. The viscosity differs between vegetable oil, coconut oil, cocoa butter, and palm oil.

Vegetable oil includes soybean, canola, and sunflower oil. These vegetable oils are typically liquid at room temperature and have a very low viscosity compared to solid fats like coconut oil or cocoa butter. The vegetable oils have a low viscosity which allows for easy application at various temperature states. However, because the vegetable oils remain liquid at room temperature, they do not provide the necessary solidity required for a stable candy coating. The oil layer may be too thin and fluid, leading to poor adhesion of the candy shell and potential dripping or smearing, which compromises the integrity and appearance of the final product. Sunflower oil includes a viscosity of about 0.005525 $Ns/m^2$.

Coconut oil has a moderately low viscosity that is still sufficient to form a thin, even coating that solidifies around the fruit, providing a stable base for the candy shell. The viscosity of coconut oil is about 0.0033 $Ns/m^2$. Other viscosities are in Table 1 below.

TABLE 1

| Oil Type | Viscosity (cP) | Viscosity (Ns/mÅ$^2$) |
| --- | --- | --- |
| Sunflower Oil | −5 | −0.005 |
| Coconut Oil | 50 | 0.05 |
| Vegetable Oil | −5 | −0.005 |
| Avocado Oil | −5 | −0.005 |
| Olive Oil | 81 | 0.081 |

Cocoa Butter: while cocoa butter provides excellent solidity when solid, its higher viscosity at room temperature makes it a less suitable option for even and thin application.

Palm Oil is difficult to apply on a candy coating, and therefore, should only be used in a combination oil setting.

While vegetable oils are advantageous for their fluidity and ease of application, their inability to solidify at room temperature (or melting point) makes them unsuitable for processes in which a solid, stable coating is required. In contrast, coconut oil, with its balance of lower viscosity for easy application and higher melting point for stability, is identified as the optimal choice. This oil ensures that the coating process is manageable, the candy shell adheres properly, and the final product retains its integrity and desired texture.

In another embodiment, the oil layer includes a combination oil comprising coconut oil with other oils. In one embodiment, the combination oil comprises coconut oil and other lower-viscosity vegetable oils, such as sunflower or canola, which adjusts the coating's viscosity for optimal application while retaining the necessary solidity at room temperature. This combination oil enabled a more tailored application process, wherein the viscosity is adjusted to suit different types of fruit surfaces or to achieve varying thicknesses of the oil layer. The combination oil not only maintained the structural integrity of the candy shell upon solidification but also enhanced the overall texture and consumption experience. This combination oil leverages the solidifying properties of coconut oil and the smoother application characteristics of other vegetable oils, offering a versatile solution in the frozen fruit coating process.

EXAMPLES

The following examples are put forth so as to provide those of ordinary skill in the art with a complete disclosure and description of how the compounds, compositions, articles, devices and/or methods claimed herein are made and evaluated and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Direct Application of Candy Coating Without Oil Layer

In the development of the method for coating frozen fruit in an oil layer, numerous experiments were conducted to explore alternatives before settling on using an oil coating. Initially, trials were performed without any oil layer, applying the candy coating directly onto the frozen fruit. These experiments quickly revealed significant issues; the direct application failed to provide a protective barrier, leading to rapid moisture migration from the fruit to the candy shell. The result was a weakened, dissolved outer shell that failed to protect the integrity and quality of the final product.

Example 2: Non-Oil Layer on Frozen Fruit and Candy Coating

Further experimentation involved alternatives to oil, such as a liquid sugar coating, a gum-based coating, and other hydrophilic solutions. However, these materials did not deliver the desired results primarily due to their inability to form a fully hydrophobic barrier. The liquid sugar coating, while initially creating a glossy and appealing surface, soon became tacky and began to absorb moisture, dissolving and compromising the candy shell. Similarly, gum-based coatings, although providing some textural benefits, were unable to prevent moisture egress, which is crucial in maintaining the crispness and structural integrity of the candy shell.

These alternative coatings lacked the hydrophobic properties necessary to effectively repel water, making them unsuitable for ensuring the longevity and quality of the candy-coated frozen fruit. The trials highlighted the necessity of a hydrophobic barrier, which only the oil coating could reliably provide, ensuring that the candy shell remained dry, intact, and adhered properly to the fruit. This led to the conclusion that an oil coating was indispensable for achieving the desired outcomes in coated frozen fruit products, effectively addressing the critical challenges of moisture management and coating integrity.

Example 3: Oil Layer Testing of Frozen Fruit and Candy Coating

In the development of an improved method for coating a frozen food product with a candy coating, extensive experimentation was conducted with various types of oils, categorized primarily by their saturated fat content. Trials included oils with both high and low percentages of saturated fats. It was observed that oils with a lower percentage of saturated fats, while effective in some contexts, did not maintain solidity at room temperature. This lack of solidity led to issues with the consistency and integrity of the candy coating, particularly through various temperature states, adversely affecting the texture. In contrast, oils with a high percentage of saturated fat remained solid at room temperatures, crucially maintaining the structural integrity and tactile quality of the candy coating. This characteristic proved essential for ensuring that the coating did not melt or deform, thereby enhancing the consumer's eating experience. The use of high-saturated fat oils was therefore deemed necessary and optimal for achieving the desired outcomes in the final product.

We also considered other properties of various oils, including common vegetable oils, and their suitability for the application. We experimented with the viscosity of various fats and ran trials with various oils including:

Vegetable oil (such as soybean, canola, and sunflower oil): These oils are typically liquid at room temperature and have a very low viscosity compared to solid fats like coconut oil or cocoa butter. Their low viscosity allows for easy application. However, because they remain liquid at room temperature, they do not provide the necessary solidity required for a stable candy coating. The oil layer may be too thin and fluid, leading to poor adhesion of the candy shell and potential dripping or smearing, which compromises the integrity and appearance of the final product.

Coconut oil has a moderately low viscosity that is still sufficient to form a thin, even coating that solidifies around the fruit, providing a stable base for the candy shell.

Cocoa Butter: while cocoa butter provides excellent solidity when solid, its higher viscosity at room temperature makes it a less suitable option for even and thin application.

Palm Oil: we found it difficult to apply this oil on its own.

Our analysis of vegetable oils reveals that, while they are advantageous for their fluidity and ease of application, their inability to solidify at room temperature makes them unsuitable for processes in which a solid, stable coating is required. In contrast, coconut oil, with its balance of lower viscosity for easy application and higher melting point for stability, is identified as the optimal choice. This oil ensures that the coating process is manageable, the candy shell adheres properly, and the final product retains its integrity and desired texture.

Example 4: Combination Oils as the Oil Layer

In the course of developing our improved method for coating frozen fruit with a candy coating, we discovered that combining coconut oil with other oils also presented a workable alternative. Specifically, blending coconut oil with lower-viscosity vegetable oils, such as sunflower or canola, allowed us to adjust the coating's viscosity for optimal application while retaining the necessary solidity at room temperature. This approach enabled a more tailored application process, wherein the viscosity could be adjusted to suit different types of fruit surfaces or to achieve varying thicknesses of the oil layer. The blend not only maintained the structural integrity of the candy shell upon solidification but also enhanced the overall texture and consumption experience. This innovative combination leverages the solidifying properties of coconut oil and the smoother application characteristics of other vegetable oils, offering a versatile solution in the frozen fruit coating process.

Conclusion

Reference throughout this specification to features, advantages, or similar language does not imply that all the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims or may be learned by the practice of the invention as set forth hereinafter.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method of applying a candy coating to a frozen fruit product, comprising the steps:
    a. Applying a layer of oil to cover the entire surface area of the frozen fruit product, wherein the layer of oil provides a moisture barrier layer between the layer of candy coating and the frozen fruit product, the layer of oil improves adhesion of the layer of candy coating to the frozen fruit product, and the layer of oil enhances the flavor and texture of the candy coated frozen fruit product, wherein the layer of oil is a thin layer having a thickness between about 0.001 mm and about 0.5 mm, and wherein the temperature of the oil while coating the frozen fruit product is between about 50° C. and about 59° C., ensuring that the oil maintains a liquid state to coat the entirety of the frozen fruit product without transitioning to the solid state; and
    b. Applying a layer of sour candy coating to the layer of oil after the layer of oil covers the entire surface area of the frozen fruit product and when the layer of oil is between about 50° C. and about 59° C.; wherein the sour candy coating is applied at room temperature before cooling the enrobed frozen fruit product, the layer of oil, and then cooling the sour candy coating back to 0° C. to ensure the frozen fruit product maintains a frozen consistency and stability, and
    wherein the layer of oil includes a high percentage of saturated fats and that thereby remains solid at room temperature is used for ensuring that the sour candy coating does not melt or deform on the frozen fruit product during packaging and the shelf-life of the frozen fruit product.

2. The method of claim 1, wherein the frozen fruit product is selected from the group consisting of pineapple, a grape, a piece of mango, a cherry, or any other bite-size fruit or piece of fruit.

3. The method of claim 2, wherein the size of the frozen fruit varies between about 1.0 inch×about 1.0 inch and about 2.0 inch×about 2.0 inch, or between about 0.5 inch×about 0.5 inch and about 3.0 inch×about 3.0 inch.

4. The method of claim 3, wherein the oil is selected from the group consisting of avocado oil, coconut oil, olive oil, palm oil, soybean oil, canola oil (rapeseed oil), corn oil, peanut oil, and other vegetable oils.

5. The method of claim 4, wherein the layer of sour candy coating comprises a mixture of sugar in any form or flavor, and the sugar further contains acids in any consumable form.

6. The method of claim 4, wherein the layer of sour candy coating comprises sugar substitutes including allulose or erythritol or the layer of sour candy coating includes a mixture of sugar and colors.

7. The method of claim 6, wherein the oil has a varying degree of hydrophobicity, which will vary the transition state from the liquid to solid for enrobing the frozen fruit product and the hydrophobicity includes a contact angle between about 4and about 14 between temperatures of about 6° C. and about 26° C.

8. The method of claim 7, wherein the oil includes a combination oil comprising coconut oil with other lower-viscosity vegetable oils, including sunflower oil or canola oil, which adjusts the coating's viscosity for optimal application while retaining the necessary solidity at room temperature.

* * * * *